Oct. 28, 1958  A. G. BALE, JR  2,857,769
REVERSIBLE DRIVE MECHANISM
Filed Feb. 1, 1956  4 Sheets-Sheet 1

INVENTOR.
ALTON G. BALE JR.
BY
ATTORNEY

Oct. 28, 1958 A. G. BALE, JR 2,857,769
REVERSIBLE DRIVE MECHANISM
Filed Feb. 1, 1956 4 Sheets-Sheet 2

INVENTOR.
ALTON G. BALE JR.
BY Ralph G. Hohenfeldt
ATTORNEY

Oct. 28, 1958  A. G. BALE, JR  2,857,769
REVERSIBLE DRIVE MECHANISM
Filed Feb. 1, 1956  4 Sheets-Sheet 3

*INVENTOR.*
ALTON G. BALE JR.
BY
ATTORNEY

Oct. 28, 1958  A. G. BALE, JR  2,857,769
REVERSIBLE DRIVE MECHANISM
Filed Feb. 1, 1956  4 Sheets-Sheet 4

INVENTOR.
ALTON G. BALE JR.
BY
ATTORNEY united States Patent Office 2,857,769
Patented Oct. 28, 1958

2,857,769

REVERSIBLE DRIVE MECHANISM

Alton G. Bale, Jr., South Milwaukee, Wis., assignor to McGraw Electric Company, Milwaukee, Wis., a corporation of Delaware Application February 1, 1956, Serial No. 562,752

6 Claims. (Cl. 74—111)

This invention pertains to a spring drive mechanism, particularly but not exclusively adapted to actuating a stepped type tap changing under load switch such as in a voltage regulator.

It is well established practice to buck or boost the potential of an electric power line by means of an autotransformer including a shunt energizing winding and a series winding having a plurality of taps which may be selectively connected in the line by a quick acting rotary switch. Conventional mechanism for driving such a switch generally includes a relatively small motor which gradually accumulates energy in a drive spring during a first interval, and means for suddenly releasing the energy for moving the tap changing switch one step. Usually a reversing switch is connected in the series winding circuit for the purpose of changing polarity of the latter with respect to the power line being regulated. The reversing switch is arranged for operating when the tap changer seeks to depart from its neutral position in response to a signal from a sensing unit. The direction of tap changer departure determines the polarity selected by the reversing switch.

The present invention is directed to mechanism for accomplishing the aforegoing switching operations and has among its objects the provision of a tap changer drive mechanism which is rugged, simple, inexpensive, and easy to maintain. Another object is to use low inertia elements which do not impact during operation so that smooth and silent performance will be attained. A more general object is to provide an improved tap changer drive mechanism.

Achievement of these and other objects will be apparent at various places throughout the description when read in connection with the following drawings in which.

Figure 1:
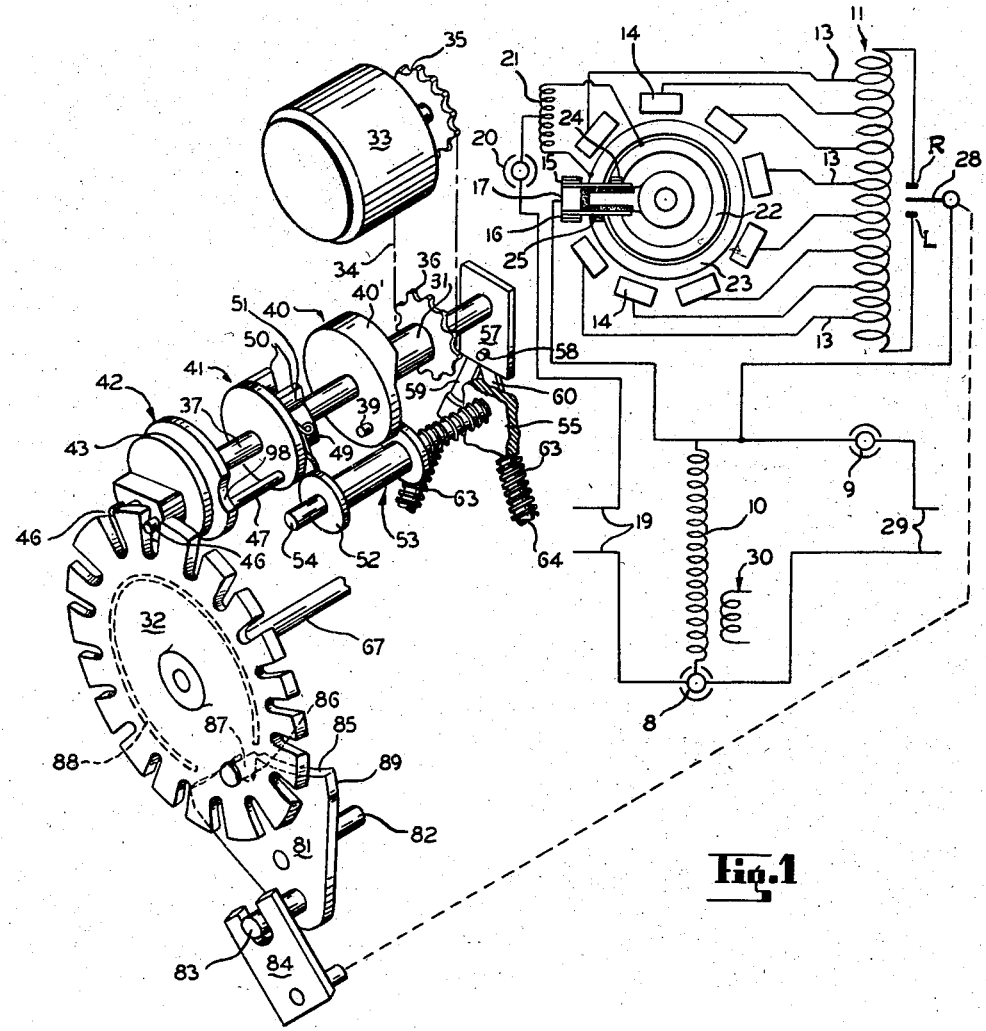
Fig. 1 illustrates an exploded view of the novel drive mechanism in conjunction with a schematically represented voltage regulator.

In Fig. 1 the novel drive mechanism is adapted to a voltage regulator including a tap changing switch and appropriate transformer windings. All the structure depicted in Fig. 1 is normally immersed in a dielectric fluid. The windings include a flux generating shunt coil 10 and a multi-tapped series winding 11 on the same core. The series winding 11 is provided with a plurality of taps 13, which lead to stationary segments 14 of a rotary tap changing switch. The tap changing switch is here shown in what corresponds with its neutral inactive position where movable contact fingers 15 and 16, which are insulated from each other, are bearing upon neutral position segment 17. It will be understood that movable contact fingers 15 and 16 may be rotated to intermediate angular positions where both fingers bear on a single segment such as 17 or to where they bridge the gap between a pair of adjacent segments 14.

The source power lines 19 are connected to an insulating bushing 20 having a lead from it to the midtap of a preventive autotransformer 21. The ends of autotransformer 21 are connected to a pair of concentric slip rings 22 and 23 forming part of the tap changing switch. Current is picked up from slip rings 22 and 23 by means of wiping contacts 24 and 25 which complete the circuit to stationary contact segments 14 or 17. Leads are taken off of each end of the series winding 11 and run respectively to fixed terminals R and L of a series winding polarity reversing switch.

When the movable contact fingers 15 and 16 are jointly rotated from neutral segment 17 in a clockwise direction as viewed in Fig. 1, reversing switch bridging bar 28 is caused to connect with reversing switch raise terminal designated R, and thus place more and more of series winding 11 in the circuits as clockwise rotation is continued. The converse is true when movable contact fingers 15 and 16 are caused to depart from neutral segment 17 in a counterclockwise direction. That is, bridging bar 28 of the reversing switch will transfer to the voltage lowering terminal designated L, thereby again placing more and more of the series winding in the circuit but with its polarity reversed with respect to the load lines 29 as compared with circumstances accompanying clockwise rotation. It will appear hereinafter that movable contact fingers 15 and 16 are prevented from executing a complete circular movement by appropriate stop means in the novel drive mechanism.

The voltage regulator also includes a low voltage winding 30 energized by shunt coil 10 for the purpose of supplying electric power to the motor of the drive mechanism and for supplying any of the conventional controlling devices usually associated with regulators. Conventional type porcelain bushings such as 8, 9 and 10 are provided for connecting the line wires to the regulator.

Figure 2:
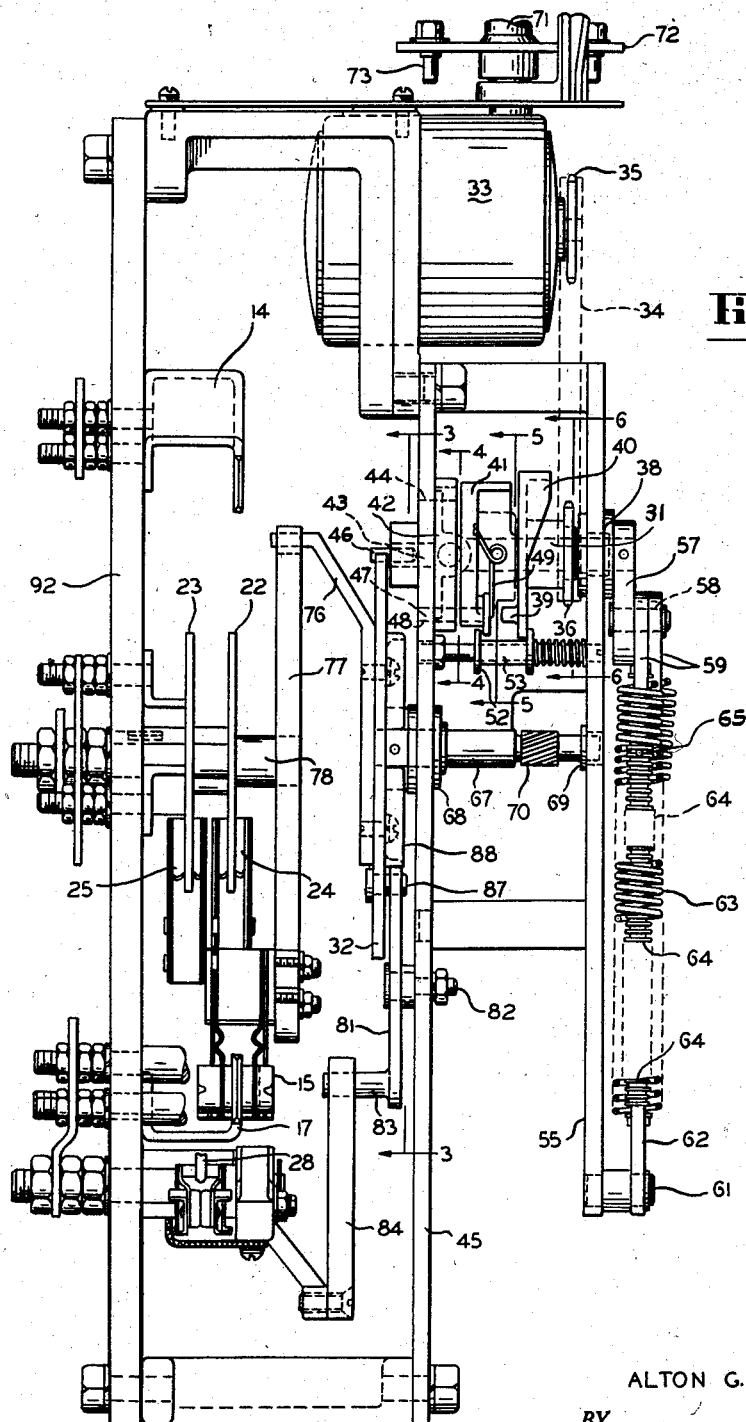
Fig. 2 is a side elevation view of a tap changing switch and the novel drive mechanism therefor.

In reference to Figs. 1 and 2, it is to be appreciated that the objective of the novel reversible drive mechanism is to advance toothed wheel 32 step by step in either direction of rotation in order to accomplish a corresponding movement of the tap changer switch movable fingers 15 and 16. To obtain the motivating power for this purpose, a reversible electric motor 33 is provided. Motor 33 rotates in one direction or the other according to conditions prevailing in the power line 29 whose voltage is being regulated. Power is transferred from motor 33 by means of a chain 34 engaged with a small motor sprocket 35 and a driven sprocket 36 forming part of a disengagement cam 40. Disengagement cam 40 together with its associated sprocket 36 is journalled on a main shaft 37.

In Fig. 1, which is a schematic assembly view, sprocket 36 appears axially displaced at a considerable distance from cam 40 so that one element does not obscure the other. In Fig. 2 it is apparent that these elements are rather close to each other in a commercial form of the invention. Actually, cam 40 is cast with an axially projecting, integral, sleeve-like hub 31 on which sprocket 36 is brazed, so that cam 40, hub 31 and sprocket 36 rotate as a single element on shaft 37.

Shaft 37 is also journalled at one end in an actuator 42 which in turn has a bearing shoulder 43 supported in and journalled for rotation in a hole 44 in a vertical supporting plate 45. It is evident that rotation of actuator 42 will cause corresponding rotation of toothed wheel 32 due to their inter-engagement by means of two axially extending pins 46 projecting from the end of actuator 42.

Figure 5:
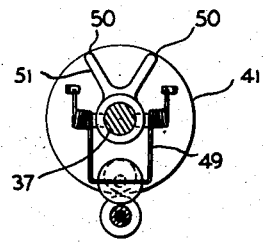
Fig. 5 is a sectional view taken on the line 5—5 in Fig. 2.
Figure 6:
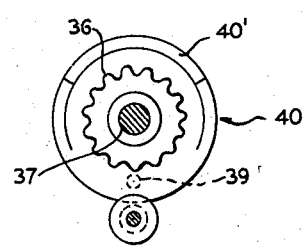
Fig. 6 is a sectional view taken on the line 6—6 in Fig. 2.

Fixedly pinned on shaft 37, intermediate actuator 42 and disengagement cam 40, is a power exchange member 41, adapted to being driven by cam 40 during an energy storing interval and adapted to connect with and rotate actuator 42 during a second tap changer driving interval. Power exchange member 41 is connected and disconnected from actuator 42 by means of a retractable pawl pin 47 which extends into registry with either one of a pair of diametrically opposite socket holes 48 in actuator 42. Pawl 47 is always biased toward actuator 42 by means of a torsion spring 49, shown in detail in Fig. 5. The side of power exchange element 41 adjacent disengagement cam 40 is provided with a pair of angularly spaced radially and axially projecting lugs 50 having driving faces 51 arranged in the orbital path of a cooperating driving pin 39 fixed in disengagement cam 40. Lugs 50 form the means for rotating power exchange member 41 through the agency of disengagement cam 40 and its pin 39.

When the drive mechanism is resting in its static position as in Figs. 1 and 2, pawl 47 is registered with one of the socket holes 48 in actuator 42. Engagement and disengagement of pawl 47 is accomplished by follower means in the form of a spool 53 adapted to be actuated by the crown 40' of disengagement cam 40. Spool 53 is supported on a guide shaft 54 which extends horizontally from drive mechanism support plate 45 to plate 55 as is clearly evident in reference to Fig. 2. A compression spring surrounds guide shaft 54 and is interposed between plate 55 and spool 53 in such manner that the spring urges the spool toward the disengagement cam 40.

Figure 7:
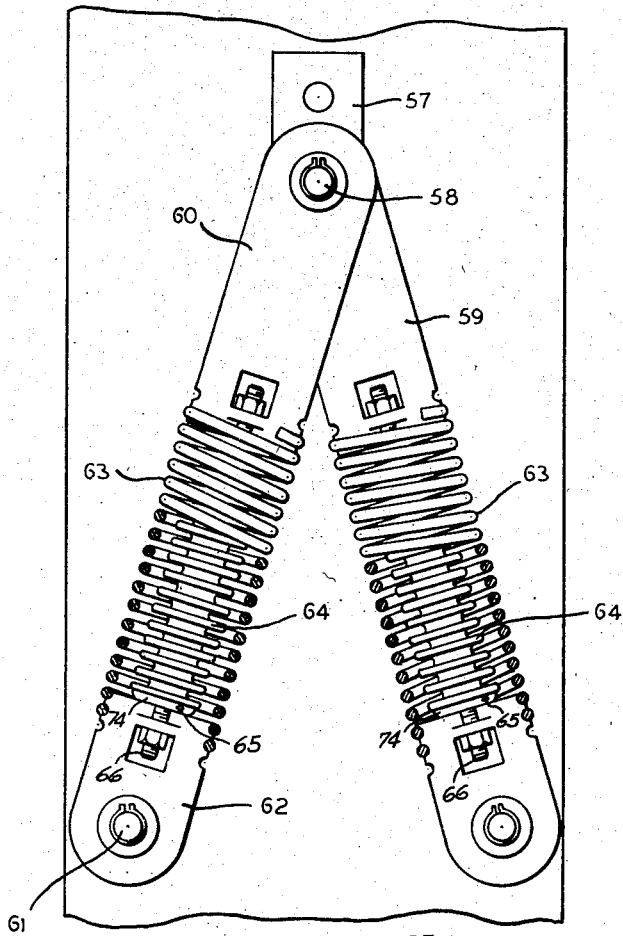
Fig. 7 is an elevational view, with parts broken away, taken from the right side of Fig. 2; and, Fig. 8 represents the same elements as Fig. 3, but certain of them are in different relative positions.

Power shaft 37 is journalled at one end in a bearing 38 carried by vertical supporting plate 55. This end of shaft 37 is provided with a crank arm 57 which is pinned on the shaft. A crank pin 58 extends through crank arm 57 and pivotally engages a pair of spring adapters 59. A pair of spring anchor posts 61 are fastened in spaced relation adjacent the bottom end of supporting plate 55 and a pair of spring adapters 62 similar to those fastened to crank pin 58, are pivotally secured to each of the anchor posts 61. A driving spring 63 is stretched between each adapter 59 carried by crank pin 58 and the respective adapters 62 carried by the anchor posts 61. It is particularly clear in Figs. 1 and 7 that springs 63 are angularly related to each other, for the purpose of assuring the presence of a sufficient vertical force component to position crank pin 58 at the dead center lowermost position in its orbit when in its static position as illustrated in those figures.

Each of the driving coil springs 63 surrounds a substantially coextensive bellows 64 fixed at each end by studs 66 to the adapter arms 59 and 62 respectively. The bellows 64 are each provided with a small orifice 65, located in a metal end cap 74, for throttling the rate of fluid inhalation and exhalation to and from the interior of the bellows 64, see Fig. 7. Thus, it is evident that the contraction rate of springs 63, and accordingly the rotational rate of the tap changer switch, is controlled by the bellows 64. It is expedient to operate the tap changer at a speed slow enough to prevent drawing an arc between contact segments 14 but fast enough to extinguish the arc without undue heating of the segments.

In Fig. 2, a toothed wheel 32 is shown supported on a shaft 67 which is journalled in a bearing 68 in vertical plate 45 and bearing 69 in the support plate 55. Shaft 67 has a worm gear 70 for driving a flexible shaft, not shown. The flexible shaft extends tightly through a socket 71 in index plate 72 mounted above motor 33 and continues to a contact position indicator, not shown. The index plate 72 is provided with a pair of pins 73 which may actuate a set of limit switches, not shown, through which the motor circuit passes. By properly locating stop pins 73 the motor 33 circuit may be opened whenever the movable contacts 15 of the tap changer switch reach a desired maximum angular position in their rotational path.

Toothed wheel 32 is provided with an arm 76 which engages an insulating tap changer drive bar journaled on the tap changer switch shaft 78. By means of inter-engagement with arm 76, the tap changer switch is compelled to assume an angular position corresponding with any given angular position of toothed wheel 32.

Figure 3:
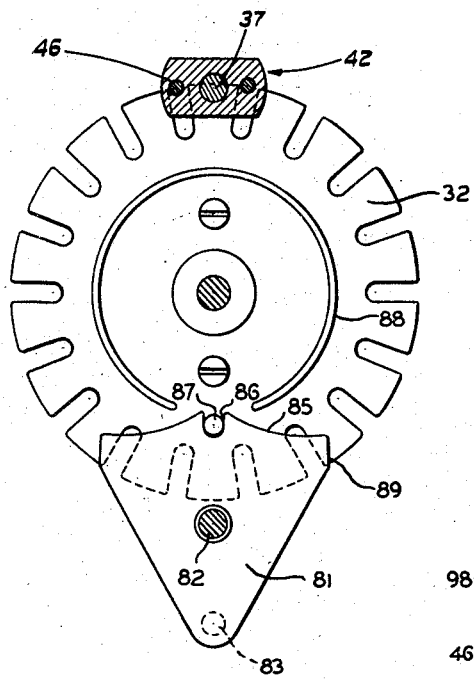
Fig. 3 is a sectional view taken on a line corresponding with 3—3 of Fig. 2.
Figure 8:
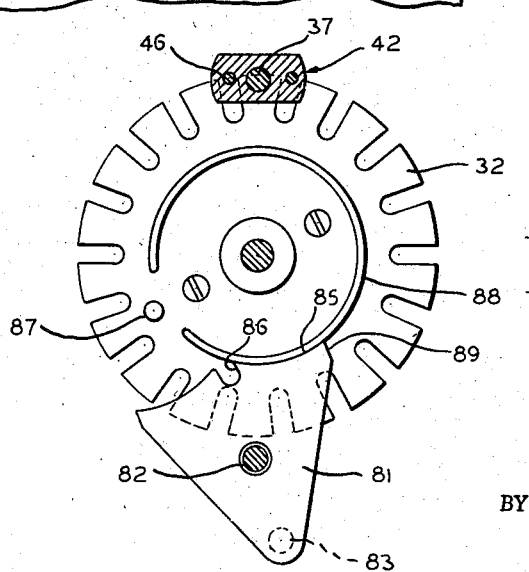

Wheel 32 also cooperates with a reversing switch segment 81 which is pivotally mounted on a stud pin 82 bolted to the vertical support plate 45. The lower end of reversing switch segment 81 is provided with a pin 83 which engages an insulating link 84 adapted to rock reversing switch bridging bar 28 into contact relation with either contact R or L whenever toothed wheel 32 rotates out of its neutral position. The configuration of reversing switch segment 81 is best seen in Fig. 3 where it is evident that it is provided with a pair of arcuate guide surfaces 85 disposed on either side of a central slot 86. Slot 86 has a pin 87 residing in it which extends from toothed wheel 32. Rotation of toothed wheel 32 from its illustrated position in Fig. 1 causes pin 87 to leave slot 86 and in addition, causes one or the other of the arcuate surfaces 85, depending upon rotation, to bear against a guide ring 88 integrally formed on wheel 32, see for example, Fig. 8. When reversing switch segment 81 is rocked as just described, pin 83 which it carries causes the insulating arm 84 to rock in an opposite angular direction so that reversing switch segment contact 28, which is driven by arm 84, is caused to connect with one of the terminals L or R at the end of series coil 11, depending upon rotation of wheel 32. As long as rotation of wheel 32 continues in the same direction originating at neutral, additional sections of coil 11 are connected in load circuit 29. When wheel 32 is reversed and returned to neutral, segment 81 is restored to neutral as in Figs. 1, 2 and 3. If reverse rotation continues, insulating arm 84 rocks in an opposite direction and causes reversing switch segment 28 to connect with the other terminal L or R, thus changing polarity of the coil 11 sections as they are progressively connected to the load line 29 by the tap changer switch described below. A complete revolution of wheel 32 is prohibited by reason of pin 87 striking either one of a pair of stop shoulders 89 formed on the outer margins of reversing switch segments 81.

Although the tap changer switch proper as illustrated in this invention, is of a form closely similar to those heretofore known in the art, it will be briefly described in connection with Fig. 2. The various stationary contact segments 14 are arranged in a circle and supported on an insulating panel 92. The various taps 13 from the series winding 11 in Fig. 1 are connected to the segments 14. Movable fingers 15 and 16 make contact with the stationary contacts 14 and conduct to the pair of slip rings 22 and 23 by means of wiping fingers 24 and 25 interconnected with movable fingers 15. The polarity reversing switch conmprises a pair of laterally spaced stationary contacts R and L between which a bridging contact arm 28 is interposed and adapted to rock into connection with either of the stationary reversing switch contacts. Operation of the reversing switch may be understood satisfactorily for the purposes of this disclosure by reference to its schematic representation in Fig. 1.

The novel tap changer switch drive mechanism functions in the following manner: Motor 33 may rotate in either direction as dictated by its controlling means, not shown. When the motor rotates, its power is transmitted to the sprocket and disengagement cam assembly 40 through the agency of chain 34. Starting from its static position as depicted in Figs. 1 and 2, disengagement cam 40 rotates freely on main shaft 37 through a predetermined angle until the crown 40' of cam 40 retracts spool 53. One of the flanges 52 on spool 53 picks up drive pawl 47 and disengages it from the socket holes 48 of actuator 42. Shortly thereafter protruding pin 39 on disengagement cam 40 strikes one of the lugs 50 on the power interchange element 41. The power interchange element 41, being pinned to shaft 37, rotates it and accordingly begins to load drive springs 63 by means of crank 57. While crank 57 is turning from its first or lowermost dead center position as depicted, pawl 47 has been rotated away from engagement with flange 52 of spool 53 and is gliding on a face of actuator 42. When crank 57 is very near its second or uppermost dead center position, pawl 47 drops into registry with one of its coacting socket holes 48 in the face of actuator 42. At this time crank 57 is also very near or at its uppermost dead center position whereupon driving springs 63 are fully extended. During extension of the springs, bellows 64 are likewise extending and inhaling some of the dielectric oil in which the drive mechanism is immersed. When uppermost dead center is passed, driving springs 63 overtake rotation of the motor and impart to shaft 37 a rapid rotary motion. The speed of rotation is controlled by exhalation of oil out of the orifice 65 in bellows 62. By means of the axially extending pins 46 in actuator 42, toothed wheel 32 is caused to rotate one step corresponding with the pitch between teeth of the toothed wheel. Angular movement of toothed wheel 32 causes a corresponding angular movement of the movable contact fingers 15 of the tap changing switch, thereby varying the proportion of series winding 11 connected in the load circuit 29. It is an important attribute of the invention that if the driving springs 63 become disconnected or broken that the tap changer drive will not be rendered totally ineffective but will continue to operate although shaft 37 will rotate slowly rather than with a snap action.

It is to be observed that when springs 63 operate shaft 37 with a snap action, there is no effect upon the normal rotational speed of motor 33 because disengagement cam 40 is freely journalled on shaft 37. During this event, pin 39 protruding from cam 40 is rotationally ahead of lugs 50 so that the protruding pin 39 may return to its static position without interference by the power interchange element 41.

It is evident that rotation of toothed wheel 32 from its neutral static position as illustrated will cause reversing switch segment 28 to rock on its pivot 82, thereby connecting the reversing switch in either its raised R, or lower L, position depending upon line conditions. As rotation of toothed wheel 32 is continued, the arcuate margin 85 of reversing switch segment 81 bears against the guide ring 88 on toothed wheel 32 thus holding the segment in the same angular position as long as rotation of the toothed wheel is continued in a single direction.

Although appropriate limit switches, not shown, are provided for opening the motor 33 circuit when toothed wheel 32 has completed nearly a full revolution, an additional means of preventing full revolution of the toothed wheel 32 resides in its pin 87 striking one of the jam shoulders 89 on the reversing switch segment 81. When the maximum rotation is reached, the drive mechanism will only respond to a control impulse which will cause reverse rotation of wheel 32 although reversing switch 28 will maintain its same position. When the wheel 32 has been returned to neutral position, reversing switch segment 81 will again be actuated by means of pin 87 in toothed wheel 32, returning it to its disconnected or neutral position as indicated in the drawing. If the line voltage sensing device, not shown, continues to call for a change of voltage in the same direction, toothed wheel 32 will again pass through its neutral position, thereby connecting reversing switch bridging bar 28 to its opposite terminal and causing the series winding 11 to be cut into the circuit with a polarity opposite from that which it had in connection with the aforegoing sequence.

Figure 4:
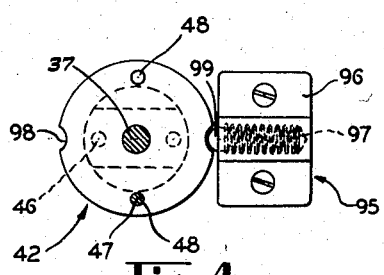
Fig. 4 is a sectional view taken on the line 4—4 in Fig. 2.

It is recalled that actuator 42 is journaled in vertical supporting plate 45 and also has shaft 37 journaled in it. In order to hold actuator 42 with socket holes 48 in a position equivalent to dead center when pawl 47 of power exchange element 41 is gliding on the face of actuator 42, a ball detent assembly 95 is provided. The ball detent is shown in detail in Fig. 4 and is seen to comprise a spring socket bracket 96 housing a compression spring 97. Diametrically opposite notches 98 are provided in the periphery of actuator 42 and a ball 99 is restrained between the periphery and spring 97. When actuator 42 is rotating, ball 99 rides on actuator 42 until the next successive notch 98 is reached, whereupon spring 97 urges the ball into notch 98. After executing a tap changer driving half-revolution, the actuator 42 is brought to a definite resting position by the force of drive springs 63 acting on shaft 37 through crank 57. The ball detent merely holds the actuator 42 in a definite position for the purpose of facilitating re-engagement of pawl 47 when drive springs 63 are fully loaded.

Although one embodiment of the novel tap changer drive mechanism has been described in considerable detail, it is to be considered as exemplary and not limiting, for the invention may be variously embodied and is to be construed according to the spirit of the following claims.

It is claimed:

1. A reversible drive mechanism including an actuator adapted for bidirectional rotation, a shaft carrying a crank arm, a spring having one end affixed to said crank arm and anchored at its other end, a driven disengagement cam element journalled on said shaft, a power exchange element fixed on said shaft and adapted to alternately connect with and disconnect from said disengagement cam and said actuator, respectively, pawl means for inter-engaging said power exchange element and actuator, spring means urging said pawl means in a direction to effect interengagement of said exchange element and actuator, follower means for retracting said pawl means in opposition to the last named spring means according to the angular position of said cam, lug means carried by one of said elements and pin means carried by the other of said elements in the same orbital path, said pin and lug means being normally in lost motion relation with each other but engageable after said cam rotates through a predetermined angle, whereby rotation of said disengagement cam element withdraws said pawl means prior to rotation of said crank by coaction of said pin and lug means and re-engages said pawl means with said actuator substantially as said crank passes over-center, and whereupon passing of said crank over-center drives said actuator one step through the medium of said power exchange element.

2. A reversible tap changer drive mechanism including an actuator mounted for bidirectional rotation, a shaft coaxial with said actuator and carrying a crank arm, a spring connected at one end to said crank arm and anchored at its other end, said spring being extensible by rotation of said crank arm from a first to second position, a cam element journalled for rotation on said shaft, a power exchange element fixed on said shaft for alternately connecting with and disconnecting from said cam element and said actuator, respectively, pawl means for inter-engaging said power exchange element and said actuator, spring means urging said pawl means in a direction to effect interengagement of said exchange element and actuator follower means cooperating with said cam element to engage and disengage said pawl in opposition to the last named spring means according to rotational positions of said cam element, lug means carried by one of said elements and pin means carried by the other of said elements, each of said means being in the same orbital path, said pin and lug means being normally in lost motion relation with each other when said crank is in first position and arranged for engagement while after said cam element rotates through a predetermined angle driving said crank to second position for extending said spring, whereby rotation of said cam disengages said pawl means, rotates said power exchange element until said crank arm is in second position, re-engages said pawl means, and said power exchange element drives said actuator one step through the agency of said pawl means.

3. The invention set forth in claim 2 including a speed control bellows operatively connected to said shaft for controlling the rotational speed thereof.

4. The invention set forth in claim 2 wherein a speed control bellows having an orifice is embraced by said spring and connected at each of said spring ends, whereby fluid may be discharged from said orifice at a controlled rate.

5. A reversible tap changer drive mechanism including an actuator mounted for bidirectional rotation, a shaft journalled in said actuator and carrying a crank arm, a spring connected at one end to said crank arm and anchored at its other end, said spring being extensible by rotation of said crank arm from a first to a second position, a cam element journalled for rotation on said shaft, a power exchange element fixed on said shaft for alternately connecting with and disconnecting from said cam element and said actuator, respectively, a pawl carried by said power exchange element and engageable with said actuator, spring means urging said pawl toward engagement with said actuator follower means engageable with said pawl and actuable by said cam to engage and disengage said pawl from said actuator in opposition to the last named spring means according to angular positions of said cam element, lug means carried by said power exchange element, driving pin means carried by said cam element and protruding in the orbital path of said lug means, said pin and lug means being normally positioned in lost motion relation substantially diametrically opposite of each other when said crank is in first position and said means being in driving relation when said crank is turning toward second position while extending said spring by rotation of said shaft, whereby rotation of said cam disengages said pawl and extends said spring corresponding with a second position of said crank, and said cam reengages said pawl with said actuator substantially as said crank passes through second position, and said actuator is rotated one step under the influence of said spring.

6. A reversible tap changer drive mechanism comprising a pair of spaced support members, an actuator journalled for bidirectional rotation in one of said support members and projecting therethrough, said actuator having diametrically spaced socket holes on a face thereof between said support members, a shaft journalled in said actuator at one end and having a fixed crank at another end beyond said other support member, a spring connected at one end to said crank and anchored at its other end, said spring being extensible by rotation of said crank from a first to a second position, a unitary cam and driven sprocket assembly journalled on said shaft, a power exchange element fixed on said shaft between said cam and actuator, said cam, exchange element, and actuator being closely confined between said spaced support members, a pawl extending from said power exchange member toward the socket holes of said actuator, spring means urging said pawl toward engagement with said actuator follower means adjacent said cam and engageable thereby to retract said pawl in opposition to the last named spring means according to angular positions of said cam, a radially diverging lug having circumferentially spaced drive faces carried by said power exchange element, driving pin means projecting from said cam in the orbital path of said lug, said pin and lug means being normally positioned in lost motion relation substantially diametrically opposite each other when said crank is in first position and said pin and lug being in driving relation when said crank is turning toward said second position and extending said spring, whereby rotation of said cam disengages said pawl and extends said spring corresponding with a second position of said crank, and said cam allows re-engagement of the pawl with said actuator substantially as said crank passes through said second position of said crank, and said actuator is rotated one step under the influence of said spring.

References Cited in the file of this patent
UNITED STATES PATENTS

| 975,659 | Vebelmesser | Nov. 15, 1910 |
| 1,891,101 | Lecount | Dec. 13, 1932 |
| 2,048,194 | Moreno | July 21, 1936 |

UNITED STATES PATENT OFFICE

CERTIFICATE OF CORRECTION

Patent No. 2,857,769                                                     October 28, 1958

Alton G. Bale, Jr.

It is hereby certified that error appears in the above numbered patent requiring correction and that the said Letters Patent should read as corrected below.

In the grant, lines 2 and 3, for "assignor to McGraw Electric Company, of Milwaukee, Wisconsin, a corporation of Delaware," read -- assignor to McGraw-Edison Company, a corporation of Delaware, --; line 12, for "McGraw Electric Company, its successors" read -- McGraw-Edison Company, its successors --; in the heading to the printed specification, lines 3, 4 and 5, for "assignor to McGraw Electric Company, Milwaukee, Wis., a corporation of Delaware" read -- assignor to McGraw-Edison Company, a corporation of Delaware --; column 6, line 70, after "actuator" insert a comma; column 7, line 3, strike out "while" and insert the same after "angle" in line 4; same column 7, line 32, and column 8, line 21, after "actuator", each occurrence, insert a comma.

Signed and sealed this 19th day of May 1959.

(SEAL)
Attest:

KARL H. AXLINE                                                         ROBERT C. WATSON
Attesting Officer                                                  Commissioner of Patents